(12) United States Patent
Katayama

(10) Patent No.: US 7,100,237 B2
(45) Date of Patent: Sep. 5, 2006

(54) GROMMET

(75) Inventor: Hiroyuki Katayama, Hiroshima (JP)

(73) Assignee: Yazaki Corporation, Tokyo (JP)

( * ) Notice: Subject to any disclaimer, the term of this patent is extended or adjusted under 35 U.S.C. 154(b) by 104 days.

(21) Appl. No.: 10/421,959

(22) Filed: Apr. 24, 2003

(65) Prior Publication Data

US 2003/0226234 A1     Dec. 11, 2003

(30) Foreign Application Priority Data

Apr. 24, 2002 (JP) .......................... P2002-122310

(51) Int. Cl.
*H02G 3/22* (2006.01)
(52) U.S. Cl. .......................... 16/2.1; 16/2.2
(58) Field of Classification Search ................. 16/2.1, 16/2.2, 2.5; 24/114.2, 114.05, 713.6, 297; 411/508, 509, 174, 913, 547, 362; 227/55
See application file for complete search history.

(56) References Cited

U.S. PATENT DOCUMENTS

| | | | |
|---|---|---|---|
| 3,091,795 A * | 6/1963 | Budwig ........................ 16/2.1 |
| 4,354,651 A * | 10/1982 | Simon .......................... 248/56 |
| 4,839,937 A | 6/1989 | Oikawa et al. |
| 5,295,652 A * | 3/1994 | Byrne ......................... 248/635 |
| 5,337,447 A * | 8/1994 | Tanaka et al. ................ 16/2.2 |
| 5,621,328 A * | 4/1997 | Yamanashi .................. 324/538 |
| 5,806,139 A * | 9/1998 | Anderson et al. ............. 16/2.1 |
| 5,973,271 A * | 10/1999 | Fujita ...................... 174/152 G |
| 6,006,406 A * | 12/1999 | Chung ........................ 24/713.6 |
| 6,167,862 B1 * | 1/2001 | Powell et al. ............ 123/198 E |
| 2003/0061680 A1 * | 4/2003 | Uchida ......................... 16/2.1 |

FOREIGN PATENT DOCUMENTS

| | | | |
|---|---|---|---|
| DE | 698 02 335 T2 | | 7/2002 |
| EP | 1 279 877 A1 | | 1/2003 |
| JP | 5-50629 | | 7/1993 |
| JP | 06-231643 | * | 8/1994 |
| JP | 7-105773 | | 4/1995 |
| JP | 7-288052 | | 10/1995 |
| JP | 10-12071 | * | 1/1998 |
| JP | 10-10255573 | | 9/1998 |
| JP | 11-141749 | * | 5/1999 |
| JP | 2001251735 | | 9/2001 |
| JP | 2003-111251 | * | 4/2003 |

OTHER PUBLICATIONS

Patent Abstracts of Japan, Publication No. 10255572 A; Sep. 25, 1998; Yazaki Corp.
Patent Abstracts of Japan, Publication No. 09129067 A; May 16, 1997; Yazaki Corp.
Patent Abstracts of Japan, Publication No. 04315712 A; Nov. 6, 1992; Yazaki Corp.

* cited by examiner

*Primary Examiner*—Robert J. Sandy
*Assistant Examiner*—Andre' L. Jackson
(74) *Attorney, Agent, or Firm*—Sughrue Mion, PLLC

(57) ABSTRACT

A grommet through which a long member is passed and mounted on a fixing hole of a fixing plate, includes an outer member and an inner member. The outer member includes a cylindrical insertion portion, through which the long member is passed, a brim-shaped close contact portion, extending outward from the insertion portion and having a mounting groove engaging with an edge of the fixing hole and an inner groove, formed on an inside face of the close contact portion. The inner member include a periphery edge portion, substantially shaped into a disc shape having a central opening, and inserted in the inner groove and a projection, extended from the periphery edge portion.

7 Claims, 7 Drawing Sheets

GROMMET

BACKGROUND OF THE INVENTION

The present invention relates to a grommet. For example, the invention relates to a grommet that is provided between two fixing plates such as those of the body and the back door of a vehicle to protect a long member that is cabled between the two fixing plates.

As shown in FIG. 5, a wire harness 103 that is cabled between a body 101 and a back door 102 of a vehicle 100 is covered with a grommet 105.

Providing the grommet 105 between the body 101 and the back door 105 and covering the wire harness 103 with the grommet 105 prevents the wire harness 103 from being exposed to outside when the back door 102 is opened.

The grommet 105 has, at the two ends, a body-side fixing portion 111 to be engaged in a fixing hole 106 (see FIGS. 6A–6E) of the body 101, a door-side fixing portion 112 to be engaged in a fixing hole 107 of the back door 102 and a bellows-shaped connection pipe 113 connecting the body-side fixing portion 111 and the door-side fixing portion 112 so as to be integral with those.

The body-side fixing portion 111 and the door-side fixing portion 112 are approximately identical members. In the following, only the door-side fixing portion 112 will be described (the description of the body-side fixing portion 111 will be omitted).

To attach the grommet 105 to the body 101 and the back door 102, the grommet 105 in which the wire harness 103 is fitted is inserted into the fixing hole 106 of the body 101 from inside the body 101 as shown in FIG. 6A and then taken out to the space between the body 101 and the back door 102 as shown in FIG. 6B.

After a tip portion 103A of the wire harness 103 is inserted into the fixing hole 107 of the back door 102, the door-side fixing portion 112 is put into the space inside the back door 102 through the fixing hole 107 as shown in FIGS. 6C–6E. Then, the door-side fixing portion 112 of the grommet 105 is engaged into the fixing hole 107 of the back door 102, whereby the grommet 105 is attached to the back door 102.

As shown in FIG. 7, to allow the wire harness 103 to pass through and be held by the fixing hole 107 (see FIGS. 6A–6E) of the back door 102, the door-side fixing portion 112 of the grommet 105 is provided with an outer member 121 and an inner member 120. The outer member 121 has a pipe-shaped insertion portion 115 that is to be inserted into the fixing hole 107 and into which the wire harness 103 can be inserted, a brim-shaped dose contact portion 116 that extends outward from the insertion portion 115 and is to come into close contact with the front face of the back door 103, a pressure contact portion 117 that is provided outside the insertion portion 115 and is to come into pressure contact with the back face of the back door 102, and a groove 118 that is formed by the inside face of the close contact portion 116. The inner member 120 is generally shaped like a disc having a central opening and is inserted in the groove 118. The inner member 120 is provided outside a pipe-shaped guide portion 119.

In general, the inner member 120 is generally elliptical in a plan view. The inner member 120 can easily be inserted into the groove 118 of the close contact portion 116 of the door-side fixing portion 112 by first inserting a portion, on its major axis 120A, of the inner member 120 into the groove 118.

By the way, when a top portion of the door-side fixing portion 112 of the grommet 105 is inserted into the fixing hole 107 of the back door 102, the close contact portion 116 may hit the back door 102 as shown in FIG. 6C.

The projection width W1 of the inner member 120 is relatively small as shown in FIG. 8A. Therefore, should the close contact portion 116 hit the back door 102, the close contact portion 116 may be turned up to come off the inner member 120 as shown in FIG. 8B.

One method for solving this problem, that is, preventing the close contact portion 116 from being turned up, would be to set the projection width W1 of the inner member 120 large and thereby increase the overlap width between the inner member 120 and the close contact portion 116.

However, if the projection width W1 of the inner member 120 is set large, a top portion 116A of the close contact portion 116 may interfere with the back door 102 as shown in FIG. 6E increases, in which case the work of attaching the grommet 105 to the back door 102 would take longer time.

SUMMARY OF THE INVENTION

It is therefore an object of the present invention to provide a grommet whose dose contact portion is prevented from being turned up and interfering with a fixing plate to which the grommet is to be attached.

In order to achieve the above object, according to the present invention, there is provided a grommet through which a long member is passed and mounted on a fixing hole of a fixing plate, comprising;

an outer member, including:
 a cylindrical insertion portion, through which the long member is passed;
 a brim-shaped close contact portion, extending outward from the insertion portion and having a mounting groove which is mounted on an edge of the fixing hole; and
 an inner groove, formed on an inside face of the close contact portion; and
an inner member, including;
 a periphery edge portion, substantially shaped into a disc shape having a central opening, and contained in the inner groove; and
 a projection, extended from the periphery edge portion.

In the above configuration, the projection extending from the periphery edge portion of the inner member is wrapped with the close contact portion. With structure, a large overlap with is secured between the inner member and the close contact portion and hence the contact portion of the grommet can be made less prone to be turned up.

Further, since the only change is that the projection is provided so as to extend from the periphery edge portion of the inner member, the inner member projects only partially. This prevents the close contact portion of the grommet from interfering with the fixing plate when the grommet is caused to pass through the fixing hole of the fixing plate.

Preferably, the periphery edge portion is shaped into an elliptical disc shape in a plan view, and-the projection projects in a crossing direction with respect to a minor axis of the periphery edge portion.

In general, when the inner member that is generally elliptical in a plan view is inserted into the inner groove of the close contact portion of the grommet, first a portion, on the major axis, of the inner member is inserted into the groove.

In view of this, the inner member is made generally elliptical in a plan view and the projection is provided so as to project in such a direction as to cross the minor axis of the inner member. With this structure, the inner member can easily be inserted into the inner groove of the close contact portion with its projection first inserted into the groove.

Preferably, the periphery edge portion is shaped into an elliptical disc shape in a plan view, and the projection projects in a crossing direction with respect to a major axis of the periphery edge portion.

Providing the projection in such a manner that it projects as to cross the major axis of the inner member makes it possible to reduce the lengths of the inner member in both of the major axis direction and the minor axis direction. Therefore, increase in the size of the inner member is prevented, that is, the inner member can be made compact. Further, this prevents the close contact portion of the grommet that covers the inner member from interfering with the fixing plate in causing the grommet to pass through the fixing hole of the fixing plate.

Preferably, the projection is a plurality of projections extended from the periphery edge portion of the inner member.

In the above configuration, providing a plurality of projections makes it possible to secure a large total overlap between the inner member and the close contact portion and to thereby more efficiently prevent the close contact portion of the grommet from being turned up.

Preferably, the inner member includes a guide portion provided with the periphery edge portion which is extended to outwardly therefrom, and the guide portion has a through hole to path through the long member. The guide portion is provided with a cut portion so as to accommodate a part of the long member.

In the above configuration, a projection length of the long member from the guide portion can be reduced. Therefore, the long member is prevented from hitting the fixing plate when the grommet is inserted into the fixing hole of the fixing plate. This makes it possible to attach the grommet to the fixing plate easily without taking much time.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

An embodiment of the present invention will be hereinafter described with reference to FIGS. 1–4. Members etc. of the following embodiment in FIGS. 1–4 that have the same or corresponding ones in FIG. 5 to FIGS. 8A and 8B are given the same or corresponding symbols as the latter and will be described in a simplified manner or will not be described.

Figure 1:
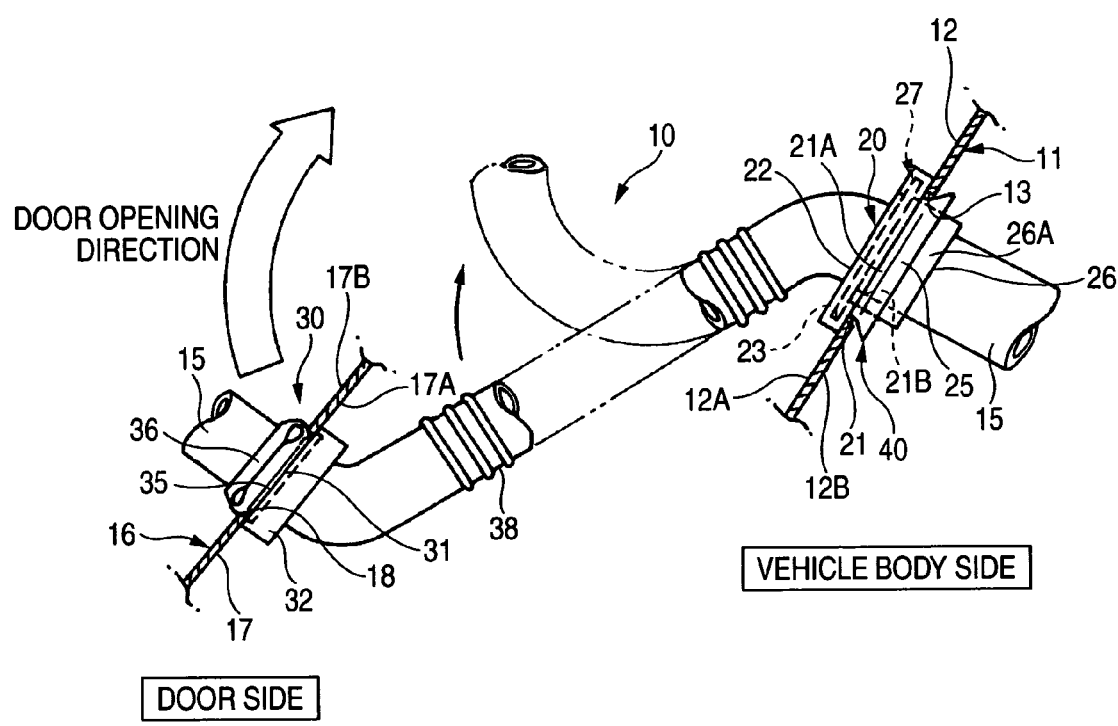
FIG. 1 is a side view of a grommet according to the invention.

As shown in FIG. 1, a grommet 10 according to the embodiment is composed of a body-side fixing main body 20 for allowing a wire harness (long member) 15 to pass through and be held by a fixing hole 13 formed in a fixing plate 12 of a vehicle body 11, a door-side grommet main body 30 for allowing the wire harness 15 to pass through and be held by a fixing hole 18 formed in a fixing plate 17 of a back door 16, and a connection member 38 that connects the body-side fixing main body 20 and the door-side grommet main body 30.

Figure 2:
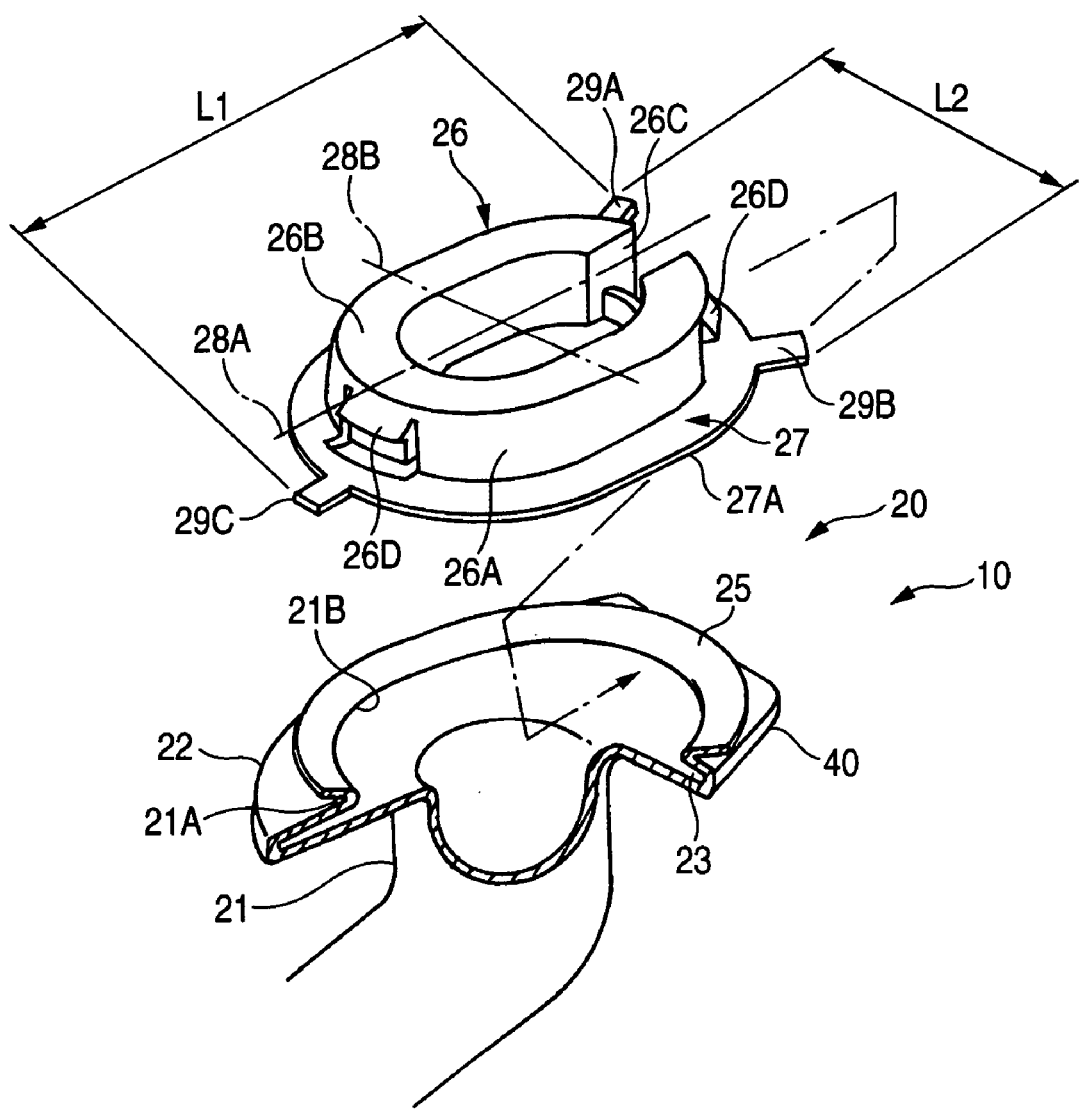
FIG. 2 is an exploded perspective view of an important part of the grommet according to the invention.
Figure 3:
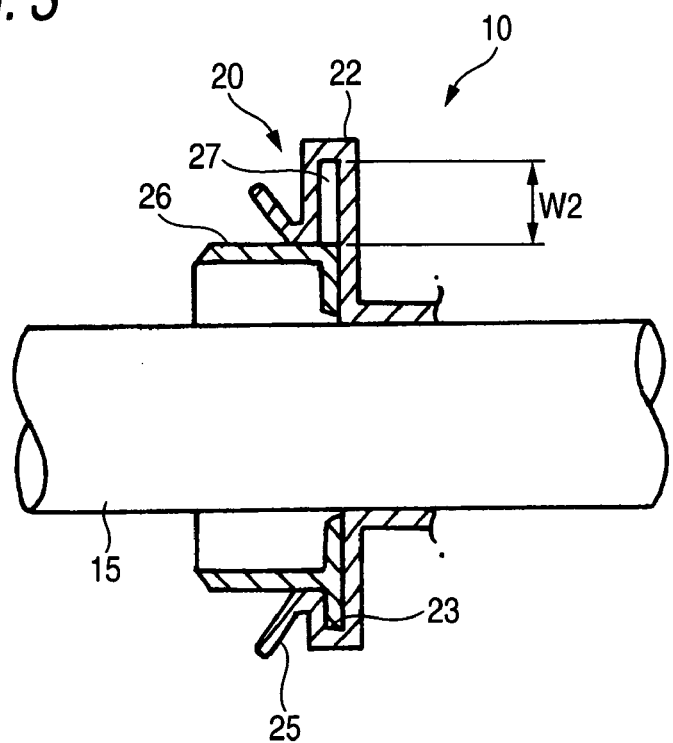
FIG. 3 is a sectional view of the important part of the grommet according to the invention.

As shown in FIGS. 1–2, the body-side fixing main body 20 has an outer member 40 and an inner member 27.

The outer member 40 has a pipe-shaped insertion portion 21 that is to be inserted into the fixing hole 13 of the vehicle body 11 and into which the wire harness 15 can be inserted, a brim-shaped close contact portion 22 that extends outward from the insertion portion 21 and is to come into close contact with a front face 12A of the fixing plate 12, a pressure contact portion 25 that is provided outside the insertion portion 21 and is to come into pressure contact with a back face 12B of the back door 12, and a groove 23 that is formed by an inside face 21B of the close contact portion 21.

On the other hand, the inner member 27 is generally shaped like a disc having a central opening and is inserted in the groove 23. The inner member 27 is connected to the outer member 40 so as to be concentric with the insertion portion 21 and extends outward from an outer circumferential face 26A of a pipe-shaped guide portion 26 that projects to at least one of the spaces on the front side and the back side (in this embodiment, the back side) of the fixing plate 12.

As shown in FIG. 2, the guide portion 26 has a pipe-like shape that is generally elliptical in a plan view, and has, on the side of an open-end face 26B and on its major axis 28A, a cut portion 26C capable of accommodating the wire harness 15 at least partially.

The inner member 27, which is generally elliptical in a plan view, extends from the outer circumferential face 26A of the guide portion 26. A plurality of (first to third) projections 29A, 20B, and 29C project from a periphery 27A of the inner member 27 in such directions as to cross the minor axis 28B of the inner member 27.

Among the first to third projections 29A, 20B, and 29C, the first and second projections 29A and 29B project in such directions as to also cross the major axis 28A of the inner member 27. In addition, the outer circumferential face 26A of the guide portion 26 is formed with a locking claw 26D for causing the guide portion 26 to be held by the fixing plate 12 when the locking claw 26D is locked into the fixing hole 13 of the fixing plate 12 via the close contact portion 22 and the pressure contact portion 25.

In general, to insert the inner member 27, which is generally elliptical in a plan view, into the groove 23 of the close contact portion 22 of the body-side grommet main body 20, first a portion, on its major axis 28A, of the inner member 27 is inserted into the groove 23 in a direction indicated by an arrow in FIG. 2.

As shown in FIG. 1, the door-side grommet main body 30 has a pipe-shaped insertion portion 31 that is to be inserted into the fixing hole 18 of the back door 16 and into which the wire harness 15 can be inserted, a brim-shaped close contact portion 32 that extends outward from the insertion portion 31 and is to come into close contact with a front face 17A of the fixing plate 17, a pressure contact portion 35 that is provided outside the insertion portion 31 and is to come into pressure contact with a back face 17B of the back door 17, and a pipe-shaped guide portion 36 that is molded integrally with the close contact portion 35 and projects to at least one of the spaces on the front side and the back side of the fixing plate 17.

The connection member 38 generally assumes a pipe-like shape so as to be able to accommodate the wire harness 15 and has a bellows-like shape in detail. Therefore, the connection member 38 can be bent into a desired shape and hence the grommet 10 can easily be provided between the fixing plate 12 of the vehicle body 11 and the fixing plate 17 of the back door 16.

In the grommet 10 having the above structure, the first to third projections 29A–29C which project from the periphery 27A of the inner member 27 are wrapped with the close contact portion 22.

This allows the close contact portion 22 to have a great wrapping length W2 (see FIG. 3), whereby the close contact portion 22 of the body-side grommet main body 20 can be prevented from being turned up.

Since the only change is that the first to third projections 29A–29C are provided so as to project from the periphery 27A of the inner member 27, the inner member 27 project only partially and the first to third projections 29A–29C can be made compact.

This prevents the close contact portion 22 that covers the inner member 27 from interfering with the fixing plate 12 when the body-side grommet main body 20 is caused to pass through the fixing hole 13 of the fixing plate 12.

The inner member 27 is generally elliptical in a plan view and the first to third projections 29A–29C project in such directions as to cross the minor axis 28B of the inner member 27 as shown in FIG. 2.

This allows the first projection 29A and the second projection 298 to be inserted first into the groove 23 in a direction indicated by an arrow in FIG. 2 when the inner member 27 is inserted into the groove 23 of the close contact portion 22. In this manner, the inner member 27 can easily be inserted into the groove 23 of the close contact portion 22.

Since the first projection 29A and the second projection 29B project in such directions as to cross the major axis 28A of the inner member 27, both of the lengths L1 and L2 of the inner member 27 along the major axis 28A and the minor axis 28B, respectively, can be reduced as shown in FIG. 2.

Therefore, the size of the inner member 27 can be reduced, that is, it can be made compact. This prevents the close contact portion 22 of the body-side grommet main body 20 that covers the inner member 27 from interfering with the fixing plate 12 when the body-side grommet main body 20 of the grommet 10 is caused to pass through the fixing hole 13 of the fixing plate 12.

In addition, since a plurality of (three) projections, that is, the first to third projections 29A–29C, are provided, a large total overlap region can be secured between the inner member 27 and the close contact portion 22. This efficiently prevents the close contact portion 22 of the body-side grommet main body 20 from being turned up.

In the grommet 10 having the above structure, as shown in FIG. 2, the open-end face 26B of the guide portion 26 is formed with the cut portion 26C capable of accommodating the wire harness 15 at least partially.

Figure 4:
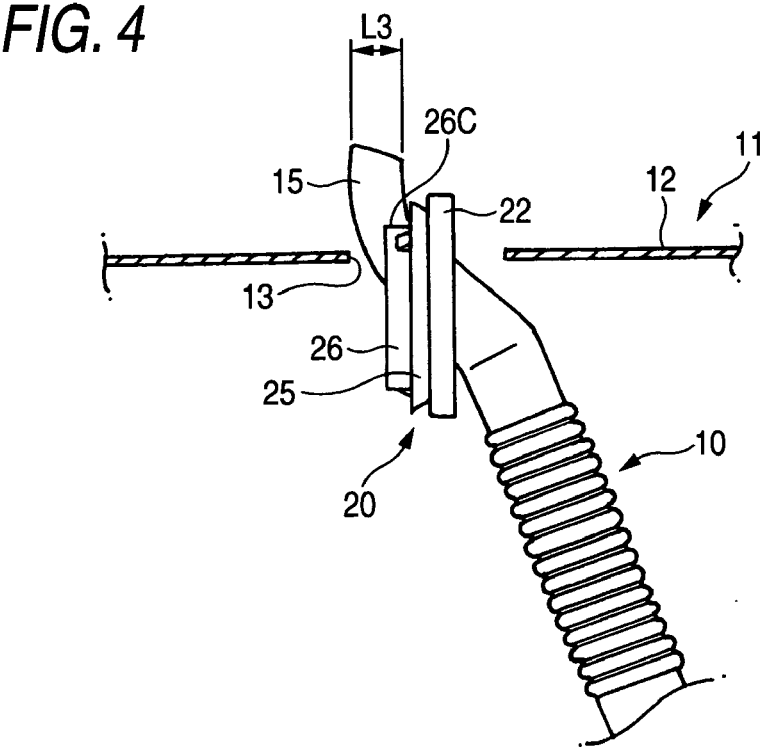
FIG. 4 is a side view of an important part of the grommet according to the invention.
Figure 5:
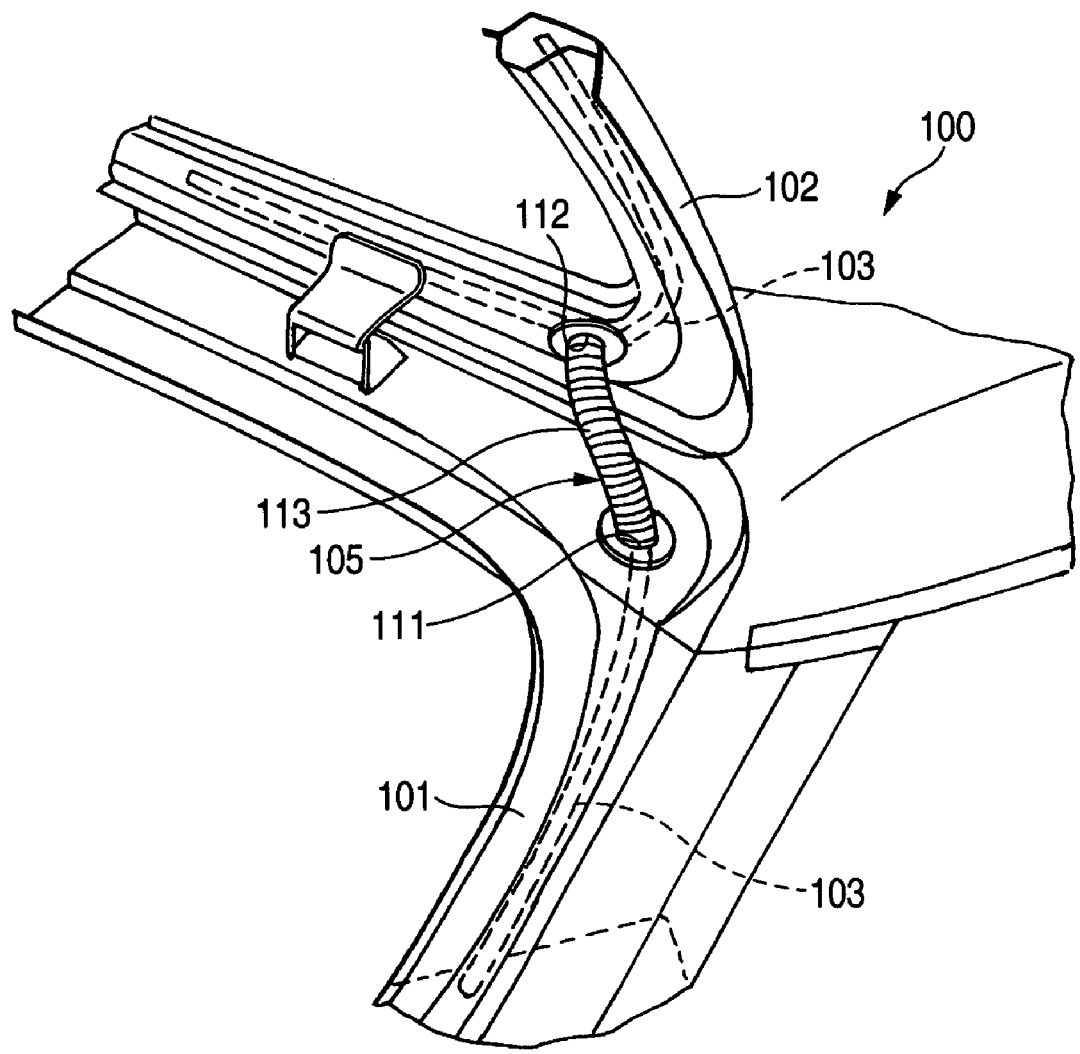
FIG. 5 is a perspective view showing a state that a related grommet is attached to a vehicle.
Figure 6A:
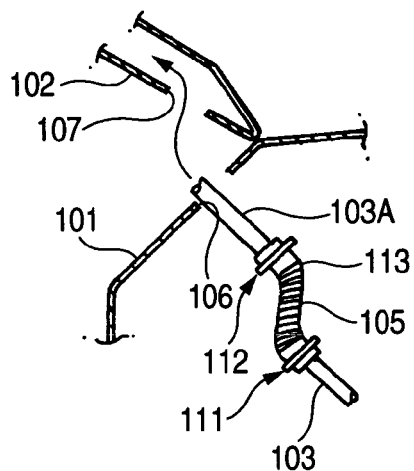
FIGS. 6A–6E illustrate a procedure for attaching the related grommet to the vehicle.
Figure 6B:
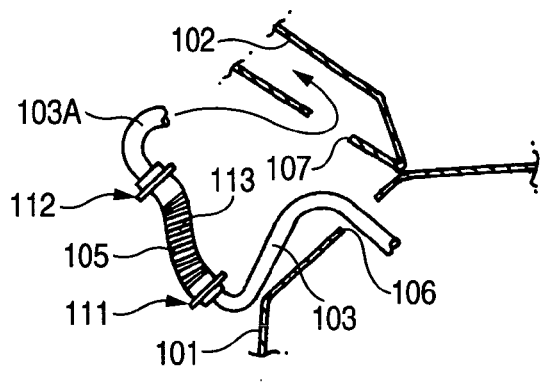
Figure 6C:
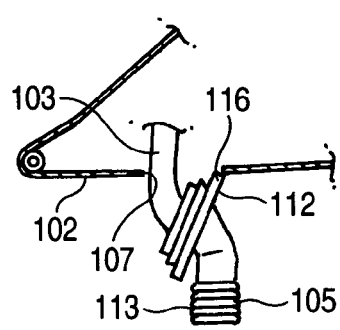
Figure 6D:
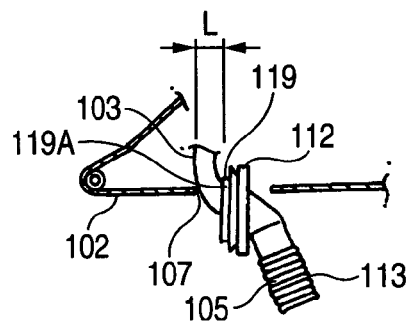
Figure 6E:
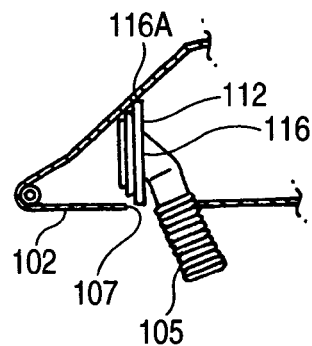
Figure 7:
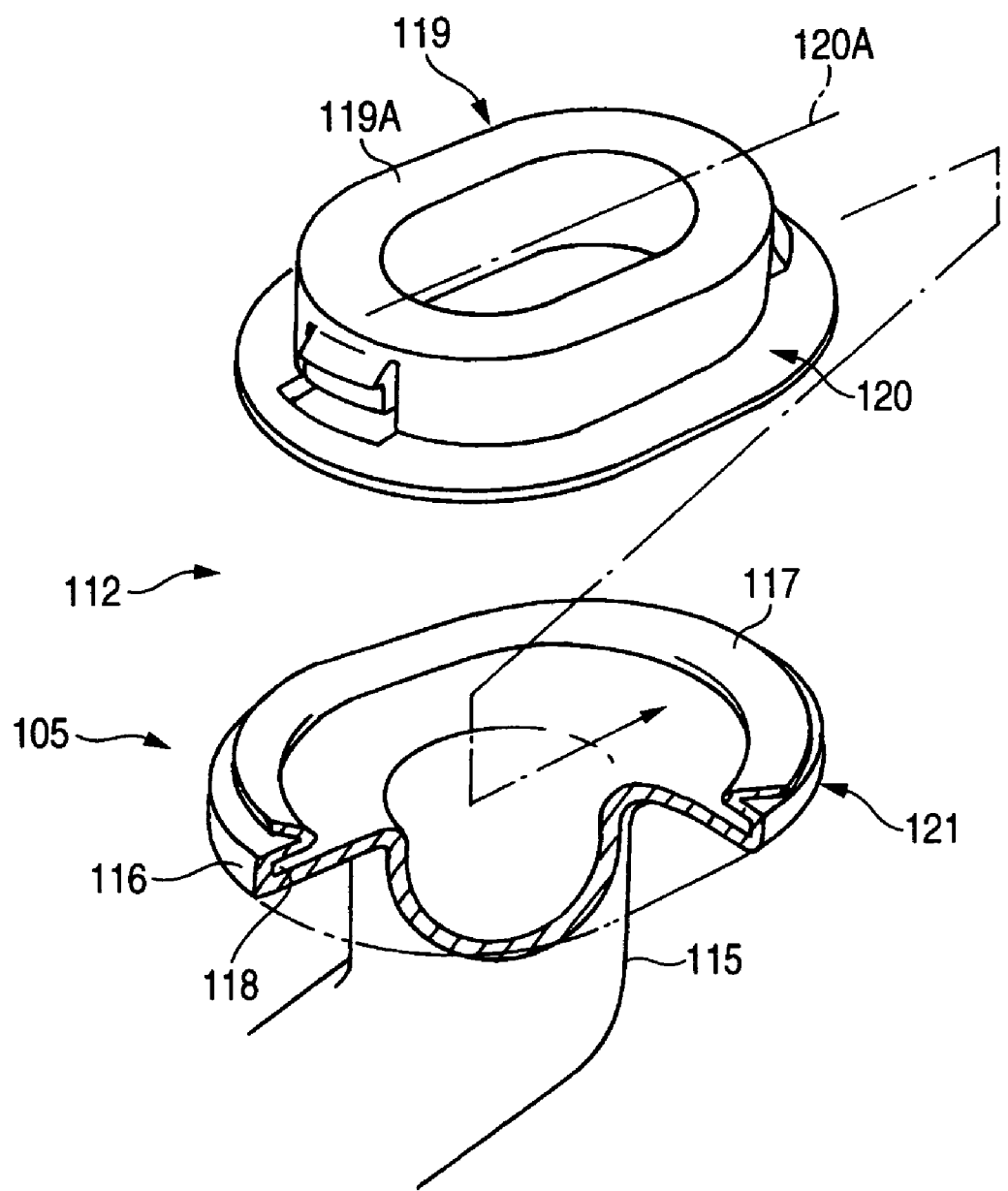
FIG. 7 is an exploded perspective view of an important part of the related grommet.
Figure 8A:
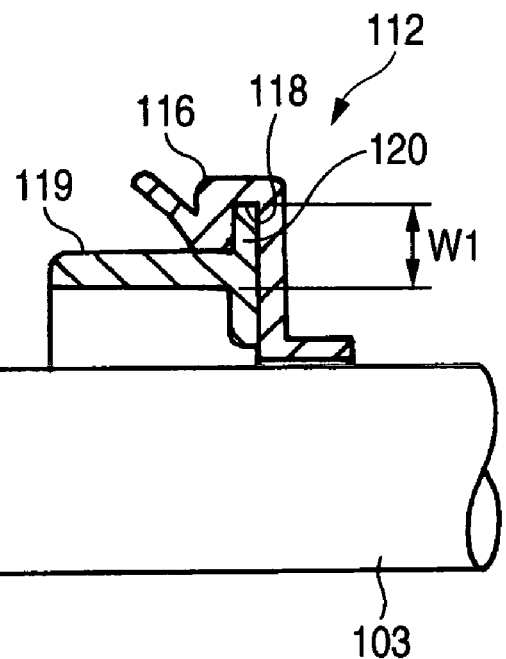
FIGS. 8A and 8B illustrate a problem of the related grommet.
Figure 8B:
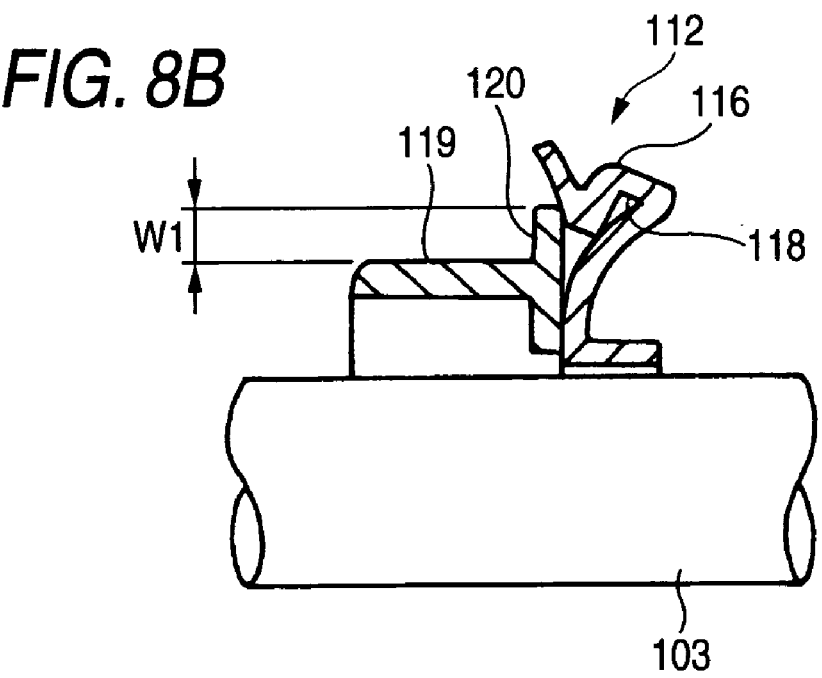

Accommodating the wire harness 15 in the cut portion 26C of the guide portion 26 as shown in FIG. 4 can reduce the projection length L3 of the wire harness 15 from the open-end face 26B of the guide portion 26.

Therefore, the wire harness 15 is prevented from hitting the fixing plate 12 when the body-side grommet main body 20 is inserted into the fixing hole 13 of the fixing plate 12. This makes it possible to attach the body-side grommet main body 20 of the grommet 10 to the fixing plate 12 easily without taking much time.

Further, as shown in FIG. 2, the guide portion 26 is generally elliptical in a plan view and is formed with the cut portion 26C on the major axis 28A of the guide portion 26. This makes it possible to accommodate the wire harness 15 in the cut portion 26C as shown in FIG. 4 easily without taking much time in pulling the wire harness 15 out of the guide portion 26.

Although the above embodiment is directed to the case that the body-side grommet main body 20 and the door-side grommet main body 30 of the grommet 10 have different structures, the invention is not limited to such a case. For example, the door-side grommet main body 30 may be given the same structure as the structure of the above-described body-side grommet main body 20.

Although the above embodiment is directed to the case that the long member is the wire harness 15 and the fixing plates are parts of a vehicle, the long member is not limited to a wire harness and the fixing plates are not limited to parts of a vehicle.

Although the above embodiment is directed to the case that the plurality of projections are the three projections 29A–29C, the number of projections is not limited to three and may be an arbitrary number.

The invention is not limited to the above-described embodiment and proper modifications, improvements, etc. are possible. The material, shape, dimensions, form, number, locations, thickness, etc. of each of the grommet, fixing plates, long member, etc. are not limited to those exemplified in the embodiment and may be determined arbitrarily as long as the invention can be implemented.

What is claimed is:

1. A grommet through which a long member is passed and mounted on a fixing hole of a fixing plate, comprising;
    an outer member, including:
        a cylindrical insertion portion, through which the long member is passed;
        a brim-shaped close contact portion, extending outward from the insertion portion and having a mounting groove which is mounted on an edge of the fixing hole; and
        an inner groove, formed on an inside face of the close contact portion; and
    an inner member, including:
        a periphery edge portion, substantially shaped into a disc shape having a central opening, and contained in the inner groove; and
        a projection, extended from the periphery edge portion, wherein the projection is contained in the inner groove.

2. The grommet as set forth in claim 1, wherein the periphery edge portion is shaped into an elliptical disc shape in a plan view; and
    wherein the projection projects in a crossing direction with respect to a minor axis of the periphery edge portion.

3. The grommet as set forth in claim 1, wherein the periphery edge portion is shaped into an elliptical disc shape in a plan view; and wherein the projection projects in a crossing direction with respect to a major axis of the periphery edge portion.

4. The grommet as set forth in claim 1, wherein the projection is a plurality of projections extended from the periphery edge portion of the inner member.

5. The grommet as set forth in claim 1, wherein the inner member includes a guide portion provided with the periphery edge portion extended to outwardly therefrom, and the guide portion having a through hole to path through the long member, wherein the guide portion is provided with a cut portion so as to accommodate a part of the long member.

6. A combination, comprising:
the grommet of claim 1, and
the fixing plate comprising the fixing hole.

7. The grommet as set forth in claim 1, wherein said inner groove extends around substantially an entire periphery of the close contact portion.

* * * * *